Feb. 26, 1929.   J. L. RUSHTON   1,703,694
CLUTCH FOR CONVEYING ROTARY MOTION
Filed Oct. 12, 1926
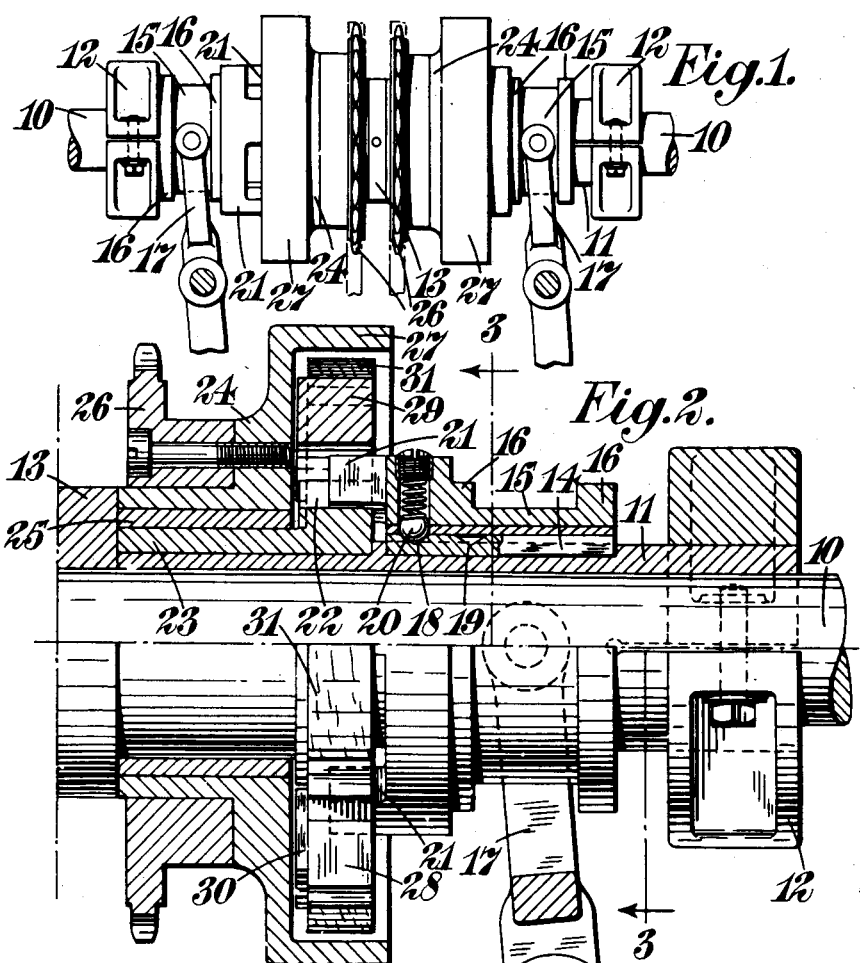
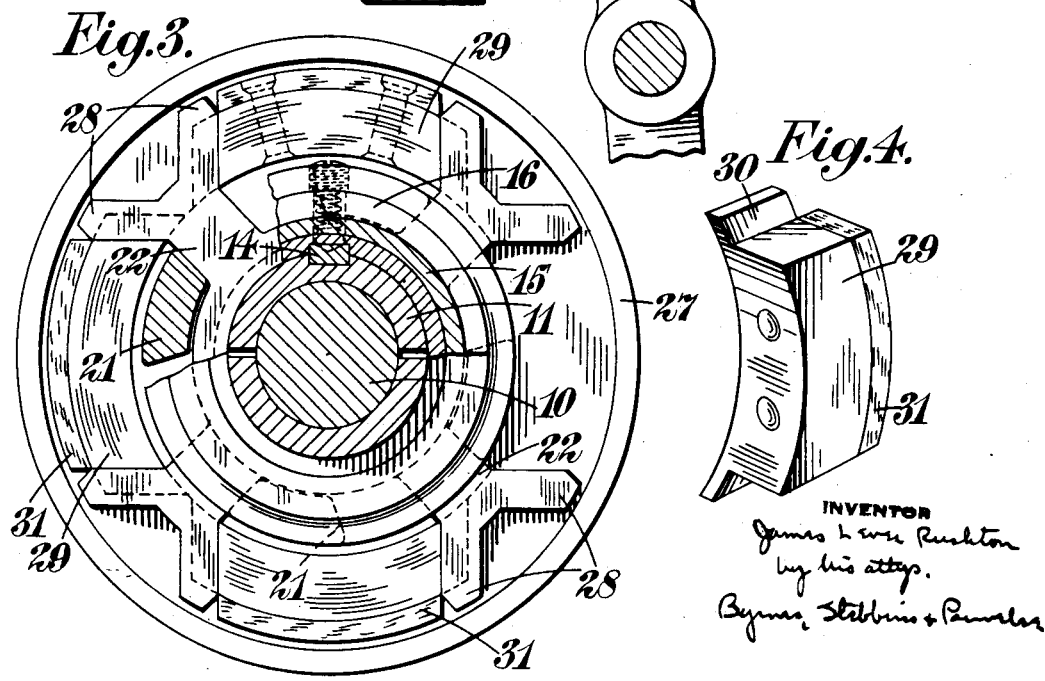
INVENTOR
James Lewis Rushton
by his attys.
Byrnes, Stebbins & Parmelee Patented Feb. 26, 1929.

1,703,694

UNITED STATES PATENT OFFICE.

JAMES LEVER RUSHTON, OF BOLTON, ENGLAND.

CLUTCH FOR CONVEYING ROTARY MOTION.

Application filed October 12, 1926, Serial No. 141,120, and in Great Britain December 22, 1925.

This invention is for improvements in or relating to clutches for conveying rotary motion, and is concerned with clutches of the type having one or more clutching members which rotate and are caused by centrifugal force to move into clutching position, such clutching members usually having frictional clutching surfaces and being consequently adapted to allow slip or lost motion under excessive stress. The invention is particularly applicable for use in the driving gear of spinning boxes in centrifugal spinning machines as used in the manufacture of artificial silk, but it is to be understood that the invention is not restricted to this particular use.

The invention has for one of its objects to provide a simple construction of clutching mechanism which will permit any individual spinning box to be easily stopped and restarted without interfering with the drive to any other boxes which may be driven from the same main shaft. It is also an object of the invention to provide a construction which shall be reliable and efficient in use and not liable to be readily deranged.

According to the primary feature of the present invention there is provided clutching mechanism comprising in combination a centrifugal clutch of the type above described, a main driving shaft and a controlling member adapted to cause or interrupt at will the transmission of drive from the shaft to the centrifugally-operated members of the clutch. This controlling member may take a variety of forms but preferably it takes the form of a clutch located between the main driving shaft and the centrifugal clutch and adapted to transmit the drive from the former to the latter, that is to say the drive from the main shaft actually passes through the controlling clutch. The main driving shaft may have a plurality of centrifugal clutches located along its length and a corresponding plurality of controlling members allocated one to each centrifugal clutch, this being a construction which is particularly applicable to artificial silk spinning machines.

According to another feature of the invention the aforesaid controlling member engages the centrifugal clutch to cause the drive thereof, but is so located in relation to the centrifugal clutch as only to engage such parts of the latter as have their setting unaltered when operative centrifugal force is developed in the centrifugal clutch. The purpose of this arrangement is to render the mechanism light in operation, since the operator will not have to overcome centrifugal force in bringing the centrifugal clutch out of operation.

In one constructional form according to the invention the controlling member takes the form of a slidable dog clutch member which is fixed as regards rotation with the main driving shaft and is so arranged relatively to the centrifugal clutch that its dog or dogs can be brought into or out of engagement with that portion of the centrifugal clutch which carries the centrifugally-operated clutching members. The slidable dog member may have combined with it locating means which determine its operative and inoperative settings.

It is preferred that the centrifugal clutch shall comprise a spider which is loosely mounted upon the main shaft and carries the centrifugally-operated clutching members, and is further so located that its arms can be engaged by a clutching dog slidable along the main shaft. The centrifugally-operated clutching members may take the form of segments which for their radial movement are guided between the arms of the spider and which have extensions received between said arms and an overlying member (for example the driven member of the centrifugal clutch) to prevent displacement of the segments along the axis of the main shaft.

For a more complete understanding of the invention there will now be described, by way of example only and with reference to the accompanying drawings, one constructional form of clutch according to the present invention. It is to be understood, however, that the invention is not restricted to the precise constructional details set forth.

In these drawings.

Figure 1 is an outside elevational view of a pair of clutches according to the invention.

Figure 2 is an elevational view, partly in section, of one of the clutches shown in Figure 1. Figure 2 is on a scale larger than that of Figure 1.

Figure 3 is a sectional view taken on the section line 3—3 of Figure 2, and

Figure 4 is a perspective view of one of the centrifugal clutching members.

Like reference numerals indicate like parts throughout the drawings.

Referring to Figure 1, the main shaft 10 is shown therein as having secured upon it two sleeves 11 (one hidden) whereof one end of each is split and embraced by a clamp 12. Two clutches are mounted about these sleeves 11 and there is a central separating member 13 mounted upon the shaft 10. The mechanism between the separating member 13 and one clamping member 12 is similar to that between the separating member and the other clamping member 12.

Referring also to Figures 2–4, each sleeve 11 has a key 14 secured in its outer surface, which key receives a longitudinally slidable dog clutching member 15 having a pair of flanges 16 for the reception of the forked end 17 of a controlling lever, such for example as is described in my copending application, Serial No. 116,139. In the outer surface of the key 14, two depressions 18 and 19 are formed with which a spring-pressed ball 20 carried by the member 15 can engage. When the ball 20 is in the depression 18 the member 15 is in its engaged position, and when the ball 20 is in the depression 19 the member 15 is in its disengaged position. Owing to the spring-pressure upon the ball 20 there is a certain amount of resistance to displacement of the member 15. Facing along the shaft 10, the member 15 carries four dogs 21 which are adapted to engage the four arms 22 of a spider which is loosely mounted upon the sleeve 11. This spider has an extension 23 from its face remote from the member 15, upon which extension 23 a casing 24 is rotatably mounted, there being an interposed anti-friction lining 25. The casing 24 carries a sprocket wheel 26 and also has a flange 27 which overhangs the outer ends of the arms 22 of the spider. The said arms 22 each terminate in branches 28 which are so disposed that the adjacent branches on two adjacent arms have opposed parallel faces. Between these opposed faces four centrifugally-operated clutching segments 29 are housed so as to be guided into and out of operative clutching position. The segments 29 have extensions 30 which are received at the back of the branches 28 between the latter and the casing 24. In this way the segments are prevented from being displaced in the direction parallel to the axis of the shaft 10 but are left free to move radially under the influence of centrifugal force. The segments 29 also have friction pads 31 on their outer curved surfaces which are intended to engage the flange 27 and drive the casing 24 and with it its sprocket wheel 26.

In operation, to commence the drive of the centrifugal clutch, the operator moves the fork 17 to slide the member 15 so that its dogs 21 shall come into engagement with the spider arms 22. The spider then rotates with the main shaft 10 and centrifugal force causes the segments 29 to fly outwards and bear against the flange 27 of the casing 24. In this way the drive is transmitted to the sprocket wheel 26. When the drive of the centrifugal clutch is to be discontinued, the operator merely slides the member 15 into its disengaged position, and it will be seen that in this movement the only force to be overcome is that of friction, since the dogs 21 do not engage any of the parts of the centrifugal clutch which are movable in position under the influence of centrifugal force. In other words, the operator does not have to overcome centrifugal force. Furthermore, when the member 15 is moved into its operative position, its dogs 21 only come into engagement with the spider arms 22. The spider is an element which is comparatively light in construction and only carries the segments 29. The total inertia to be overcome is thus but small and it therefore follows that the control of the centrifugal clutch is but light work for the operator.

It is to be understood that the invention is not restricted to the precise constructional details set forth.

I claim:—

1. Clutching mechanism comprising in combination a centrifugal clutch of the type described, a main driving shaft and a controlling member mounted on the main driving shaft to turn therewith and adapted to cause or interrupt at will the transmission of drive from the shaft to the centrifugally-operated members of the clutch, which controlling member is slidable towards and from that part of the clutch which carries the centrifugally operated members to connect therewith and drive it and thereby cause the centrifugally operated members to move into clutching position.

2. Clutching mechanism comprising in combination a centrifugal clutch of the type described, a main driving shaft, a slidable dog clutch member which is fixed as regards rotation with the main driving shaft and means whereby said dog clutch member can be moved relatively to the centrifugal clutch so that its dogs can be brought into and out of engagement with that portion of the centrifugal clutch which carries the centrifugally-operated clutching members.

3. Clutching mechanism comprising a main shaft, a centrifugal clutch of the type described mounted on said shaft, said clutch comprising a spider with arms which spider is loosely mounted upon the main shaft and carries the centrifugally-operated clutching members, and a slidable dog clutch member which is fixed as regards rotation with the main driving shaft and is so arranged that its dogs can be brought into and out of engagement with the arms of the said spider.

4. Clutching mechanism comprising in combination a centrifugal clutch of the type described, a main driving shaft, a slidable dog clutch member which is fixed as regards rotation with the main driving shaft and is so arranged relatively to the centrifugal clutch that its dogs can be brought into and out of engagement with that portion of the centrifugal clutch which carries the centrifugally-operated clutching members, and locating means combined with the dog clutch member to determine its operative and its inoperative settings.

5. Clutching mechanism comprising in combination a centrifugal clutch of the type described, a main driving shaft, a slidable dog clutch member which is fixed as regards rotation with the main driving shaft and is so arranged relatively to the centrifugal clutch that its dogs can be brought into and out of engagement with that portion of the centrifugal clutch which carries the centrifugally-operated clutching members, and locating means combined with the dog clutch member to determine its operative and its inoperative settings, said locating means comprising a spring-pressed ball member co-operating with recesses.

6. Clutching mechanism comprising a main shaft, a centrifugal clutch of the type described mounted on said shaft, said clutch comprising a spider which is loosely mounted upon the main shaft and centrifugally-operating clutching segments which for their radial movement are guided between the arms of the spider and which have extensions received behind said arms to prevent displacement of the segments along the axis of the main shaft, and a slidable dog clutch member which is fixed as regards rotation with the main driving shaft and is so arranged that its dogs can be brought into and out of engagement with the arms of the said spider.

7. Clutching mechanism comprising a main shaft, a centrifugal clutch of the type described mounted on said shaft, said clutch comprising a spider which is loosely mounted upon the main shaft, a member overlying the arms of the spider but spaced away therefrom, and centrifugally-operating clutching segments which for their radial movement are guided between the arms of the spider and which have extensions received between the said spider arms and the overlying member to prevent displacement of the segments along the axis of the main shaft, and a slidable dog clutch member which is fixed as regards rotation with the main driving shaft and is so arranged that its dogs can be brought into and out of engagement with the arms of the said spider.

8. Clutching mechanism comprising a main shaft, a centrifugal clutch of the type described mounted on said shaft, said clutch comprising a spider which is loosely mounted upon the main shaft, a member overlying the arms of the spider and constituting the driven member of the centrifugal clutch, said member being spaced away from the arms of the spider, and centrifugally-operating clutching segments which for their radial movement are guided between the arms of the spider and are caused by centrifugal force to bear against a portion of the said overlying member and which have extensions received between the said spider arms and the overlying member to prevent displacement of the segments along the axis of the main shaft, and a slidable dog clutch member which is fixed as regards rotation with the main driving shaft and is so arranged that its dogs can be brought into and out of engagement with the arms of the said spider.

In testimony whereof I affix my signature.

JAMES LEVER RUSHTON.